(12) United States Patent
Jenski, Jr. et al.

(10) Patent No.: US 6,557,824 B1
(45) Date of Patent: May 6, 2003

(54) RELEASABLE COUPLING ASSEMBLY

(75) Inventors: Gary M. Jenski, Jr., Jackson, MI (US); Alexander P. Webster, Concord, MI (US); Kenneth G. Phaneuf, Chelsea, MI (US); Lisa M. Shaw, Parma, MI (US)

(73) Assignee: Eaton Aeroquip, Maumee, OH (US)

( * ) Notice: Subject to any disclaimer, the term of this patent is extended or adjusted under 35 U.S.C. 154(b) by 0 days.

(21) Appl. No.: 09/692,874

(22) Filed: Oct. 20, 2000

(51) Int. Cl.[7] ................................. F16L 37/28
(52) U.S. Cl. ................. 251/149.6; 251/149.9; 137/614.03
(58) Field of Search ................... 251/149.6, 149.7, 251/149.1, 149.8, 149.9; 137/614.03

(56) References Cited

U.S. PATENT DOCUMENTS

| | | | | |
|---|---|---|---|---|
| 4,200,121 A | * | 4/1980 | Walter et al. | 137/614 |
| 4,219,048 A | * | 8/1980 | Ekman | 137/614.03 |
| 4,429,713 A | * | 2/1984 | Walter | 137/614.03 |
| 4,436,125 A | * | 3/1984 | Blenkush | 251/149.6 X |
| 4,765,657 A | * | 8/1988 | Cruse | 251/149.9 |
| 4,924,909 A | * | 5/1990 | Wilcox | 137/614.03 |
| 4,949,745 A | * | 8/1990 | McKeon | 137/614.03 X |
| 5,002,254 A | * | 3/1991 | Belisaire et al. | 251/149.8 |
| 5,211,197 A | * | 5/1993 | Marrison et al. | 137/614 |
| 5,385,331 A | | 1/1995 | Allread et al. | 251/149.1 |
| 5,445,358 A | * | 8/1995 | Anderson | 251/149.6 |
| 5,553,895 A | | 9/1996 | Karl et al. | 285/39 |

* cited by examiner

Primary Examiner—Gene Mancene
Assistant Examiner—Eric Keasel
(74) Attorney, Agent, or Firm—Rader, Fishman & Grauer PLLC

(57) ABSTRACT

A releasable coupling assembly for connecting two members is provided that includes a first member having an exterior surface with a receiving portion and a second member having a hose adapter and a sleeve valve positioned within the adapter. The sleeve valve is in slidable communication with the adapter and includes at least one socket aperture that includes a mating ball that contacts at least one longitudinal groove in the adapter that includes a first and expanded radial portion. When the members are secured together, the ball of the sleeve valve is retained in the receiving formation of the first member by the first radial portion of the longitudinal groove of the hose adapter. When the members are pulled apart for disconnection, the sleeve valve initially remains engaged with the first member until the ball comes into contact with the expanded radial portion of the longitudinal groove of the hose adapter and the ball departs the receiving formation of the first member, such that the valve is completely or almost completely closed prior to disconnection of the members.

15 Claims, 6 Drawing Sheets

CONNECTED POSITION

DISCONNECTED POSITION

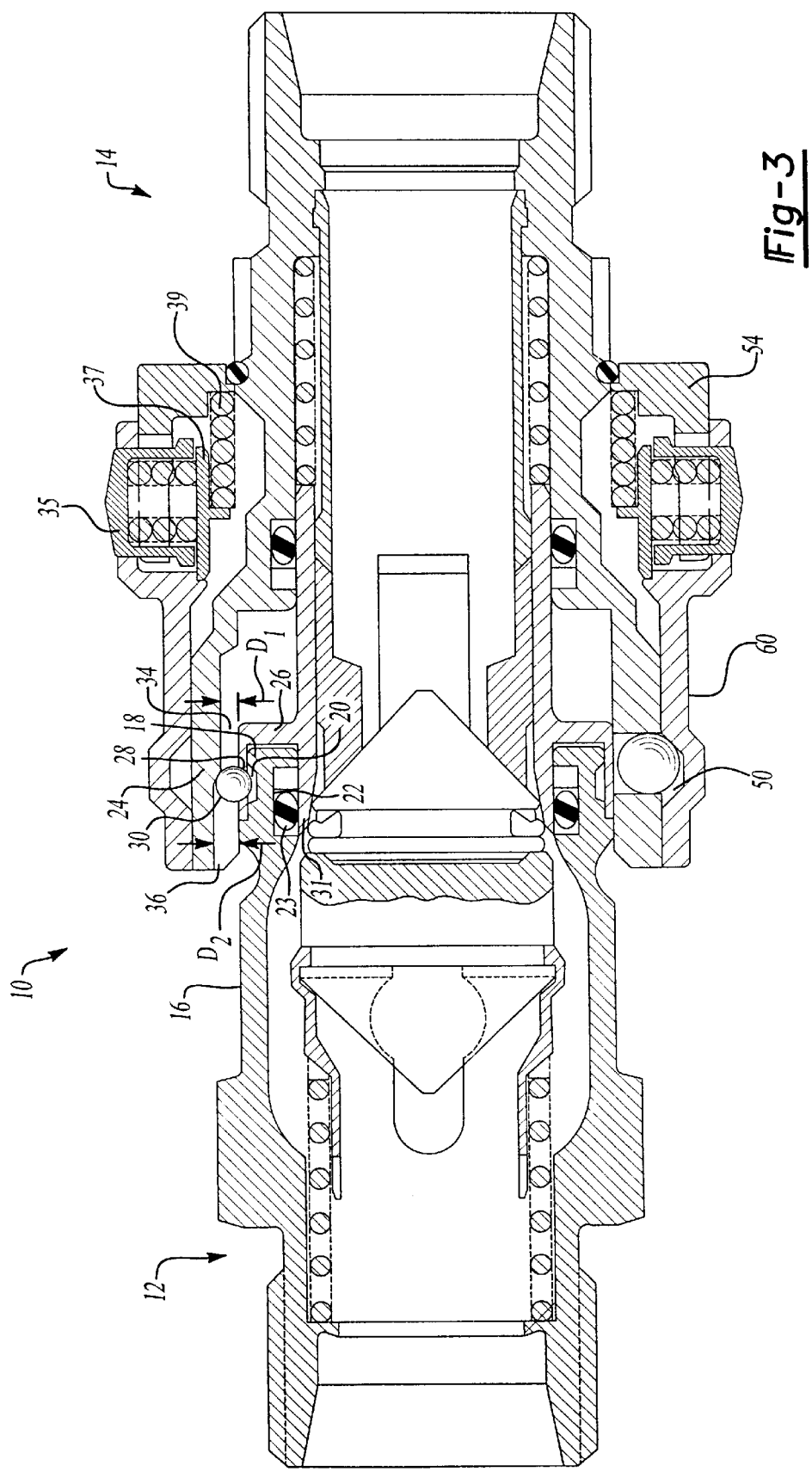

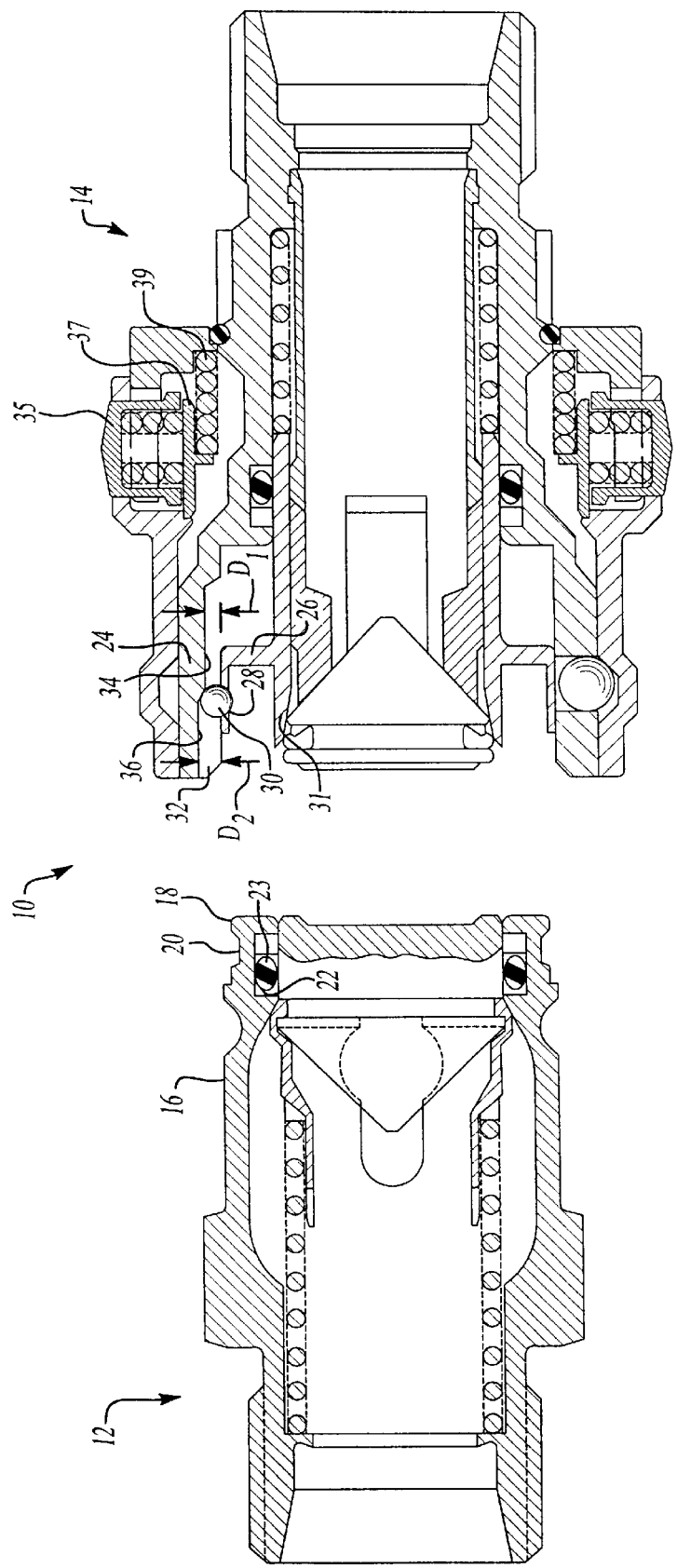

RELEASABLE COUPLING ASSEMBLY

FIELD OF THE INVENTION

The present invention relates generally to a coupling assembly for connecting two members together and more particularly to a releasable coupling assembly that improves valve closure when the members are disconnected.

BACKGROUND OF THE INVENTION

Releasable coupling assemblies for the transmission of gases or fluids are known in the art. A concern of designers of such assemblies is the possibility that a valve does not close upon disconnection. In a number of assemblies a compression spring is used to close a valve sleeve, but the associated seal drag can increase substantially the longer it is set in one position, possibly preventing proper closure. Those skilled in the art continue to attempt to improve or enhance current designs of releasable coupling assemblies, particularly to improve valve closure when the members are disconnected. The present invention provides an effective quick disconnect coupling that improves disconnection.

SUMMARY OF THE INVENTION

The present invention recognizes the aforementioned challenges and the limitations associated with conventional quick disconnect coupling assemblies and provides a releasable coupling assembly that includes a mechanical closing sleeve that improves valve closure during disconnection of the members of the assembly.

In accordance with an embodiment of the present invention, a coupling assembly for connecting two members is provided that includes a first member and a second member. The first member has an exterior surface that includes a receiving formation, such as a circumferential groove. The second member has a portion for receiving the first member and includes a hose adapter and a sleeve valve that is positioned radially, and preferably concentrically, within the adapter. The sleeve valve is in slidable communication with the adapter and includes a plurality of socket apertures with mating balls. The hose adapter includes a plurality of longitudinal grooves having at least first and expanded radial portions or segments, in which the depth of the expanded radial portion of the grooves is greater than the depth of the first radial portion of the grooves. When the first member and second member are secured together, the balls of the sleeve valve are retained in the receiving formation of the first member by the first radial portion of the longitudinal grooves of the hose adapter. When the members are pulled apart to implement disconnection, the sleeve valve will initially remain engaged with the first member until the balls come into contact with the expanded radial portion of the longitudinal grooves of the hose adapter and the balls depart the receiving formation of the first member. The foregoing coupling assembly provides the advantage of ensuring that the valve is completely or almost completely closed before the members are disconnected.

BRIEF DESCRIPTIONS OF THE DRAWINGS

The features and inventive aspects of the present invention will become more apparent upon reading the following detailed description, claims, and drawings, of which the following is a brief description:

FIG. 3 is a cross-sectional view similar to the view of FIG. 1 showing the coupling members during disconnection.

FIG. 4 is a cross-sectional view similar to the view of FIG. 1 showing the coupling members disconnected.

DETAILED DESCRIPTION OF PREFERRED EMBODIMENT

Figure 1:
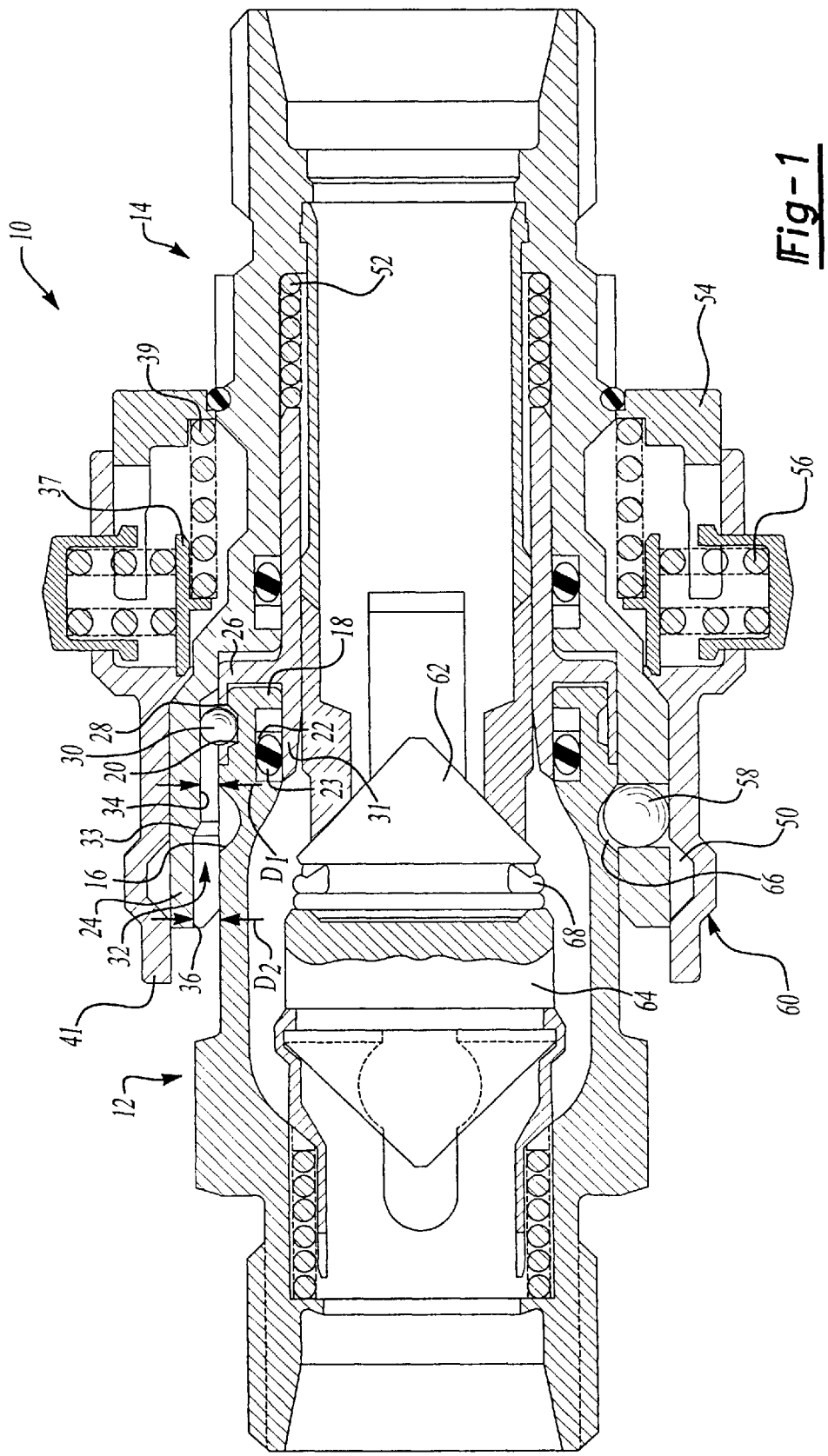
FIG. 1 is a simplified cross-sectional view of an embodiment of the present invention showing the coupling members in the connected position.

Referring now to the drawings, the preferred embodiments of the present invention are described in detail. Referring to FIG. 1, a preferred embodiment of a coupling assembly 10 is shown that includes a first member 12 and a second member 14 shown in a connected configuration. Members 12 and 14 preferably have a generally tubular shape. The first member 12, which generally functions as the "male" member of the coupling assembly 10, includes an exterior surface 16 with an engagement end 18 having a receiving formation 20. The formation 20 is preferably a circumferential groove or other form of indentation or recess in the exterior surface 16 of the first member 12. Moreover, the first member may include one or more additional receiving formations, such as second receiving formation (circumferential groove) 66.

In a preferred embodiment, the first member also includes a lower formation 22, such as a transverse circumferential groove, with a sealing member 23, such as an O-ring seal. Such sealing member 23 may be made of a variety of elastomeric materials or other materials as is well known in the art.

The second member 14 generally functions as the "female" member of the coupling assembly 10 and is designed to receive a portion of the first member 12. The second member 14 preferably includes a generally tubular hose adapter 24 and a sleeve valve 26 that is positioned radially, and preferably concentrically, within the adapter 24. The sleeve valve 26, which is preferably loaded by a compression spring 52, is in slidable communication with the adapter 24 and includes one or more socket apertures 28 with a mating ball 30. In a preferred embodiment, the adapter 24 includes a plurality of longitudinal grooves 32 to accept aperture 28-ball 30 combinations and the sleeve valve 26 includes a lower flange 31. Preferably, the flange 31 is generally in communication with the lower formation 22 of the first member 12 and the sealing member 23 when the members 12, 14 are engaged. Preferably, the engagement of first and second members (or coupling halves) 12, 14 is maintained by retainers 58 that are held in mating slots of adapter 24 and are held in the second receiving formation (circumferential groove) 66 of the first member 12 by a release sleeve 60, of second member 14. Release sleeve 60 is in slidable communication with adapter 24 and is spring loaded or biased toward mating half 12 by spring 39.

The hose adapter 24 further includes one or more longitudinal grooves 32 having at least a first radial portion 34 and an expanded radial portion 36. The depth $D_2$ of the expanded radial portion 36 is greater than the depth $D_1$ of the first radial portion 34 of the grooves 32. The number and circumferential location of longitudinal grooves 32 generally corresponds to the number and circumferential location of the aperture 28-ball 30 combinations of the sleeve valve 26.

As illustrated in FIG. 1, the longitudinal grooves 32 preferably include a transition radial portion 33 positioned between first and expanded radial portions 34, 36. The slope of the transition radial portion can be designed and configured to improve or optimize the functional characteristics of the assembly 10, including the difficulty or ease of release and disconnection. Second member preferably also includes indicator-lock pins 35 that are held up or away from the centerline of the assembly 10 by compression spring 56. Retainer 54 has a plurality of slots permitting the indicator-lock pins 35 largest diameter to travel inside the wall thickness of the retainer 54 when the release sleeve 60 is forward with leading edge 41 positioned ahead of adapter 24. Further, release sleeve 60 is maintained in such forward position by compression spring 39.

Figure 2:
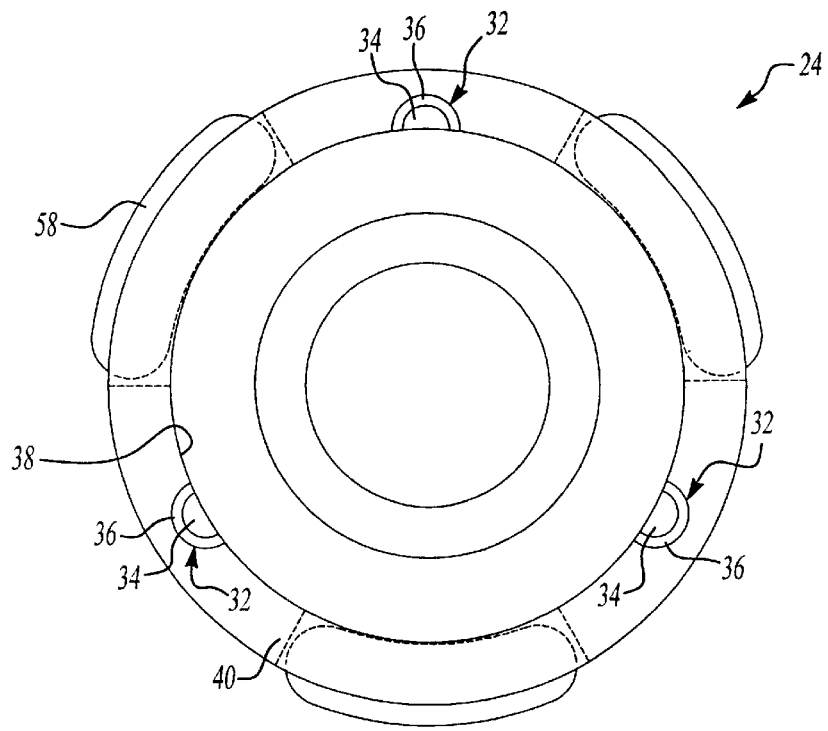
FIG. 2 is a front view of an adapter.

FIG. 2 is a front view of a preferred embodiment of the hose adapter 24. The depicted adapter 24 includes three longitudinal grooves 32 that are equally spaced about the inner periphery of the inner edge 38 of the outer ring segment 40. FIG. 2 illustrates the preferred semi-circular or rounded shape of the first and expanded radial portions 34, 36 of the grooves 32. Preferably, the grooves 32 will be sized and formed to accommodate the size and shape of the balls 30 of the sleeve valve 26. However, while a preferred embodiment is illustrated, the present invention is not limited to a particular number of grooves or to grooves having a specified shape.

When the first member 12 and second member 14 are secured together, such as shown in FIG. 1, the balls 30 of the sleeve valve 26 are retained in the receiving formation 20 of the first member 12 by the first radial portion 34 of the longitudinal grooves 32 of the hose adapter 24. In a preferred embodiment, the lower flange 31 of the sleeve valve 26 completely or substantially encloses a sealing member 23 within the lower formation 22 of the first member 12.

FIG. 3 depicts an embodiment of the coupling assembly 10 that illustrates the disengagement of the first and second members 12 and 14. In a preferred embodiment, disengagement is initiated by depression of the indicator-lock pins 35 or other conventional actuation/locking devices. The indicator-lock pins 35 may be manually depressed to a point at or in close proximity with the actuator formation 37. Preferably, the positioning means 39, which is in communication with the hose adapter 24 is compressed during such disengagement until the release sleeve groove 50 reaches retainers 58 and allows the retainers 58 to exit or disengage the receiving groove 66 of member 12. When the coupling members 12 and 14 are being disconnected and the user pulls the second member 14 away from the first member 12, the sleeve valve 26 remains engaged and in communication with the receiving formation 20 of the first member 12 while the ball 30 is in contact with and at least partially restrained by the first radial portion 34 of the longitudinal groove 32. As the ball 30 reaches the transition radial portion 33 and the expanded radial portion 36 of the longitudinal grooves 32, the ball 30 vectors radially outwardly from the receiving formation 20. As the lower portion of the ball 30 clears the uppermost portion of the receiving formation 20 the sleeve valve 26 disengages the engagement end 18 of the first member 12 and the sealing member 23 of the lower formation is retained by another portion of the first member 12. By maintaining the connection of the sleeve valve 26 as described, the sleeve is completely or almost completely closed prior to the final disconnection of members 12 and 14. FIG. 4 shows the coupling members after disconnection.

When the first and second coupling members 12 and 14 are re-connected, the foregoing disengagement process is generally reversed. As the engagement end 18 of the first member 12 is inserted into the valve sleeve 26, the ball 30 is pushed along the expanded radial portion 36 toward the transition radial portion 33 and the first radial portion 34. As the first member 12 continues entry into the second member 14, the ball 30 encounters the first radial portion 34 and the ball 30 is urged into communication with the receiving formation 20 of the first member 12 so that the valve sleeve 26 and the first member 12 connect and/or "lock" together. The first and second members 12, 14 are pushed or urged toward one another until retainers 58 reach the second receiving formation 66 of first member 12. Retainers 58 are directed or vectored downwardly into the groove of release sleeve 60, which is in slidable communication with adapter 24 and is preferably spring loaded or biased toward first member 12 by spring 39.

Figure 5A:
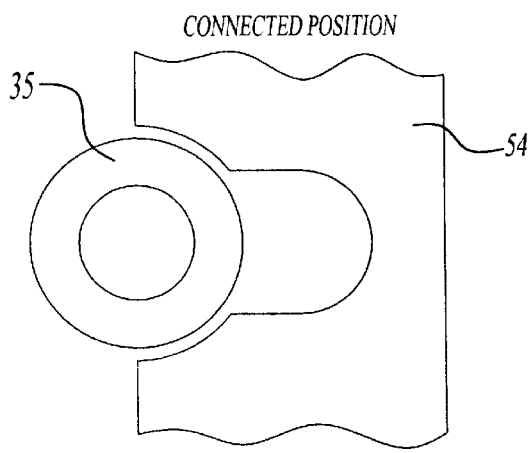
FIG. 5A is an illustration of a retainer and an indicator-lock pin shown in a connected configuration.
Figure 5B:
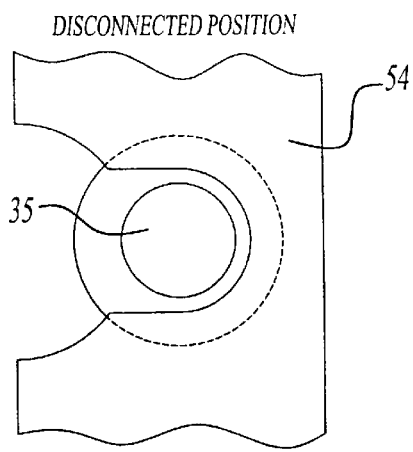
FIG. 5B is an illustration of a retainer and an indicator-lock pin shown in a disconnected configuration.

Once release sleeve 60 is positioned forward with leading surface 41 extending beyond adapter 24, indicator-lock pins 35 protrude radially outwardly from the centerline of the member. Preferably, spring 56 pushes indicator-lock pins 35 through the enlarged slot of retainer 54. FIG. 5A illustrates such an embodiment, wherein the indicator-lock pin 35 is shown in a connected configuration with respect to a portion of retainer 54. FIG. 5B shows the pin 35 and retainer 54 is a disconnected configuration.

Figure 6:
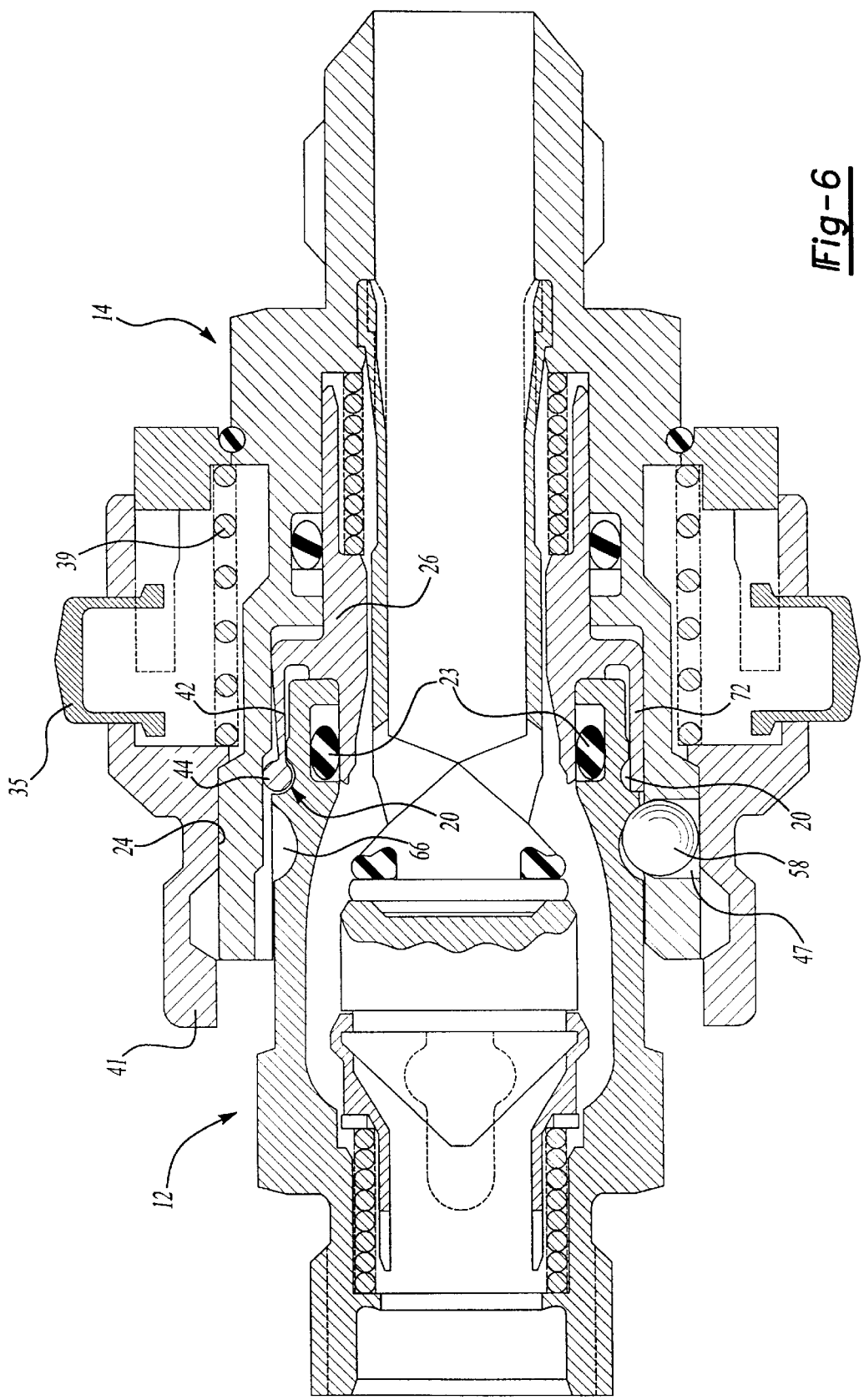
FIG. 6 is cross-sectional view of a second embodiment of the present invention.

FIG. 6 is cross-sectional view of another embodiment of the present invention. In this embodiment, the valve sleeve 26 of the second member 14 includes at least one finger 42—and more preferably, a plurality of fingers. The finger 42 includes a forward portion 44 that remains in contact with the engagement end 18 of the first member for a given distance during the disconnection of the first and second members 12 and 14. A finger 42 can be formed by creating longitudinal cuts or slots in the valve sleeve 26 or by using conventional formation techniques. The forward portion 44 of the finger 42 can take on any number of shapes. However, the forward portion 44 preferably includes a curved surface to facilitate the communication or engagement/disengagement with other components of the assembly, such as the receiving formation 20.

As the finger 42 is pulled in the longitudinal direction away from the second member 14 and towards the first member 12, the forward portion 44 of the finger 42, which is in slidable communication with the adapter 24, is eventually permitted to move or expand radially outward. Preferably, the adapter 24 includes similar longitudinal slots (as those discussed in connection with the prior embodiments) to receive the forward portion 44 of the finger 42.

As previously described in connection with the present invention, a user can depress the indicator-lock pins 35 and pull release sleeve 60 of member 14 away from member 12 to disconnect the members. The retainers 58 are vectored or moved radially outwardly from receiving formations 66 of member 12 into receiving formation 50 of release sleeve 60. The sleeve valve 26 has a straight diameter section 72 adjacent to the finger ends 44. This straight section 72 of the sleeve valve 26 is in communication with and slides or moves under retainers 58, thereby, holding them radially outward and inside of receiving formation 50 of release sleeve 60. Moreover, as the members 12, 14 come apart or separate the finger ends 44 remain engaged or in communication with receiving formation 20 of first member 12 until valve reaches transition 33. After the transition 33, the finger ends 44 are allowed to expand radially outward and release from formation 20 of member 12. At this point, sleeve valve 26 is closed or almost closed against seal 68 sealing off fluid.

Figure 7:
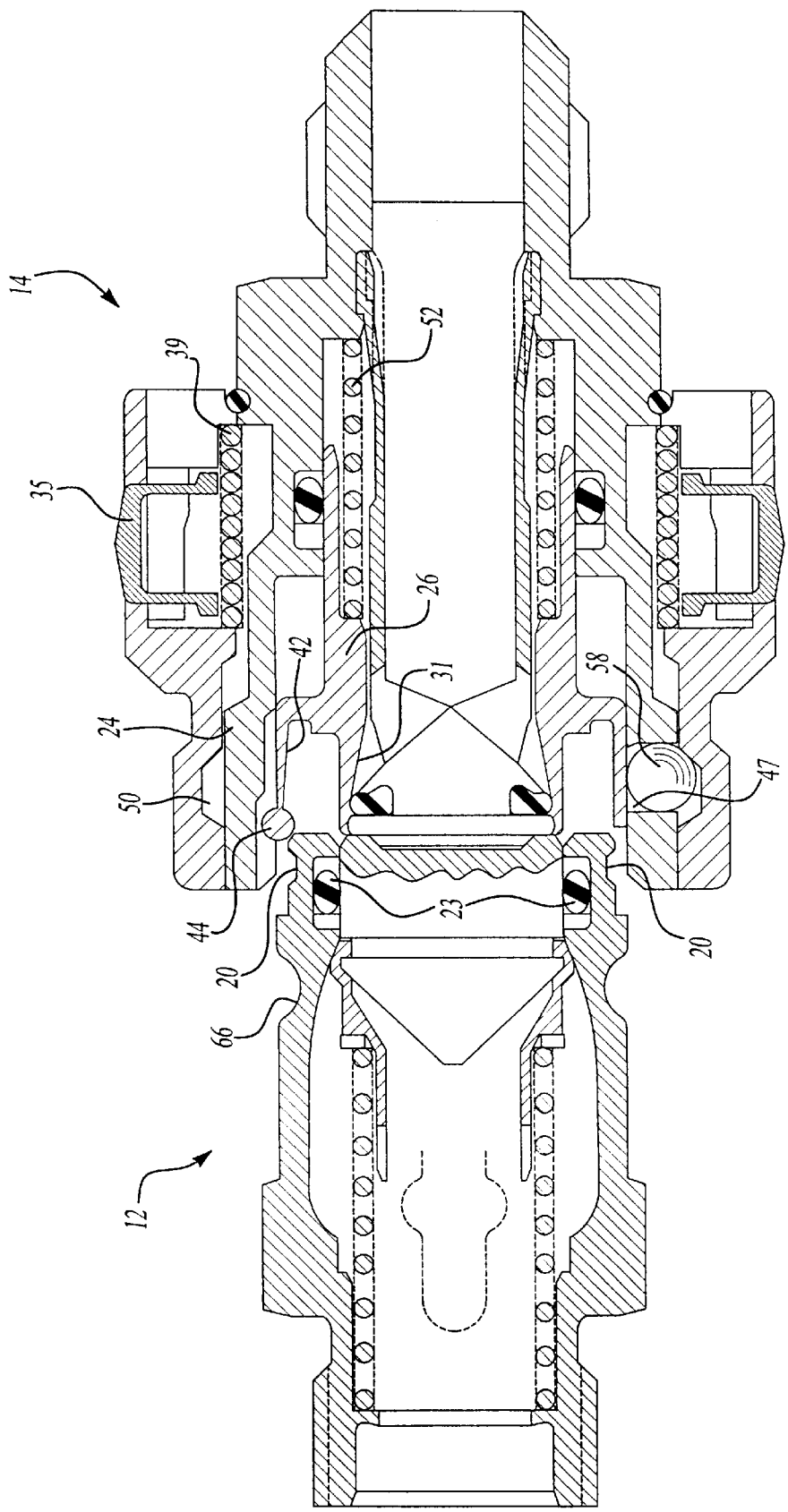
FIG. 7 is a cross-sectional view of the embodiment shown in FIG. 6 showing the coupling members being disconnected.

FIG. 7 is a cross-sectional view of the assembly shown in FIG. 6 that shows the nearly complete disengagement of the first and second members 12 and 14. As illustrated, the lower portion of the retainers 58 have been forced out of the receiving formations 66 of the male member 12 and at least partially into the grooves 50 by the straight section 72.

Engagement of the first and second members 12 and 14, such as those depicted in FIG. 7, is essentially the converse of the disengagement of the components as generally described above. As the first member 12 is inserted into the second member 14, the forward portion 44 of the finger 42 is received within a formation on the first member 12 and the valve sleeve 26 is slidably moved in a direction away from the first member 12 towards the second member 14. The forward portion 44 of finger 42 are deflected inward toward centerline of members by transition angle 33 and eventually trapped inside receiving formation 20 of member 12 by smaller first longitudinal slot 34 of adapter 24. At some stage, preferably when the forward straight section 72 of the finger 42 has generally departed from or "clears" the opening 47 of the adapter 24, the retainer 58 is permitted to withdraw or move radially inward from groove 50, and the valve sleeve 26 communicates with a mechanical formation, such as a spring 52, which translates a force on the adapter 24 that permits the receiving formation 20 of the first member 12 to further enter the second member 14 and allows the retainer 58 to be received within the receiving formation 66 of the first member 12. Preferably, the motion of the sleeve 26 and adapter 24 encourages the actuator positioning means 39 to expand and move the release sleeve 60 over the top of the retainer 58. As the release sleeve moves forward toward member 12 the indicator-lock pins 35 are allowed to be moved by spring 56 in an outward direction away from centerline of members through opening of retainer 54 as shown in FIG. 5A.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A releasable coupling assembly for connecting two members, comprising:
   a first member having an exterior surface, said exterior surface including a receiving formation;
   a second member having a portion for receiving a portion of the first member, the second member including an adapter and a sleeve valve positioned within the adapter,
   wherein the sleeve valve is in slidable communication with the adapter, the sleeve valve includes at least one socket aperture that includes a mating ball, and wherein the adapter includes at least one longitudinal groove having at least a first and expanded radial portion, the depth of the expanded radial portion of the groove being greater than the depth of the first radial portion of the groove;
   whereby, when the first member and second member are secured together, the ball of the sleeve valve is retained in the receiving formation of the first member by the first radial portion of the longitudinal groove of the adapter; and
   whereby, when the members are pulled apart for disconnection, the sleeve valve initially remains engaged with the first member until the ball comes into communication with the expanded radial portion of the longitudinal groove of the adapter and the ball sufficiently departs the receiving formation of the first member, such that the valve is at least almost completely closed prior to disconnection of the members to minimize the transmission of gases or fluids.

2. A releasable coupling assembly as recited in claim 1, wherein the receiving formation of the first member includes a circumferential groove.

3. A coupling assembly as recited in claim 1, wherein the second member includes at least two indicator-lock pins that are in communication with the adapter and control the initiation of disengagement of the first and second members.

4. A coupling assembly as recited in claim 1, wherein the longitudinal groove includes a transition radial portion positioned between the first radial portion and the expanded radial portion.

5. A coupling assembly as recited in claim 4, wherein the transition radial portion comprises a sloped surface to optimize the connection of the first and second members.

6. A coupling assembly as recited in claim 1, wherein the first member includes a lower formation.

7. A coupling assembly as recited in claim 6, wherein the lower formation includes a sealing member.

8. A method for disconnecting two members of a releasable coupling assembly, comprising the steps of:
   providing a first member having an exterior surface and a receiving formation that is connected to a second member having a portion for receiving a portion of the first member, the second member including an adapter and a sleeve valve positioned within the adapter,
   wherein the sleeve valve is in slidable communication with the adapter, the sleeve valve includes at least one socket aperture that includes a mating ball, and wherein the hose adapter includes at least one longitudinal groove having at least a first and expanded radial portion, the depth of the of the expanded radial portion of the groove being greater than the depth of the first radial portion of the groove;
   and further wherein the ball of the sleeve valve is retained in the receiving formation of the first member by the first radial portion of the longitudinal groove of the adapter; and
   separating the first and second members whereby the sleeve valve initially remains engaged with the first member until the ball comes into communication with the expanded radial portion of the longitudinal groove of the adapter such that the ball sufficiently departs the receiving formation of the first member and the valve is at least almost completely closed prior to disconnection of the members to minimize the transmission of gases or fluids.

9. A releasable coupling assembly for connecting two members, comprising:
   a first member having an exterior surface and a lower formation, said exterior surface including a receiving formation having a groove;
   a second member having a portion for receiving a portion of the first member, the second member including an adapter, a sleeve valve positioned within the adapter and an indicator-lock pin in communication with the adapter, wherein the sleeve valve is in slidable communication with the adapter, the sleeve valve includes at least one socket aperture that includes a mating ball, and wherein the adapter includes at least one longitudinal groove having at least a first and expanded radial portion, the depth of the expanded radial portion of the groove being greater than the depth of the first radial portion of the groove;

whereby, when the first member and second member are secured together, retainers are locked into a second receiving formation of a release sleeve of the second member and the mating ball of the sleeve valve is retained in the receiving formation of the first member in the first radial portion of the longitudinal groove of the adapter, and whereby, when the members are pulled apart for disconnection, the sleeve valve initially remains engaged with the first member until the ball comes into communication with the expanded radial portion of the longitudinal groove of the adapter and the ball sufficiently departs the receiving formation of the first member, such that the valve is at least almost completely closed prior to disconnection of the members to minimize the transmission of gases or fluids.

10. A coupling assembly for connecting two members, comprising:

a first member having an exterior surface, said exterior surface including a receiving formation;

a second member having a portion for receiving a portion of the first member, the second member including a leading edge and a longitudinal groove in the portion for receiving the first member that is positioned inwardly from the leading edge, the second member further including a hose adapter and a sleeve valve positioned within the adapter, wherein the sleeve valve is in slidable communication with the adapter and includes at least one finger having a forward portion and wherein the hose adapter includes at least one longitudinal groove having at least a first and expanded radial portion, the depth of the expanded radial portion of the groove being greater than the depth of the first radial portion of the groove;

whereby, when the first member and second member are secured together, the forward portion of the finger is retained in the receiving formation of the first member by the first radial portion of the longitudinal groove of the hose adapter, and whereby, when the members are pulled apart for disconnection, the sleeve valve initially remains engaged with a formation of the first member until the front portion of the finger comes into communication with the expanded radial portion of the longitudinal groove of the hose adapter and the finger radially expands to depart from the receiving formation of the first member, such that the valve is substantially closed prior to disconnection of the members.

11. A releasable coupling assembly as recited in claim 10, wherein the receiving formation of the first member includes a circumferential groove.

12. A coupling assembly as recited in claim 10, wherein the first member includes a lower formation.

13. A coupling assembly as recited in claim 12, wherein the lower formation includes a sealing member.

14. A coupling assembly as recited in claim 10, wherein the second member includes an indicator-lock pin that is in communication with the hose adapter and controls the initiation of disengagement of the first and second members.

15. A method for connecting two members of a releasable coupling assembly, comprising the steps of:

providing a first member having an exterior surface, said exterior surface including a receiving formation;

providing a second member having a portion for receiving a portion of the first member, the second member including an adapter and a sleeve valve positioned within the adapter, wherein the sleeve valve is in slidable communication with the adapter, the sleeve valve includes at least one socket aperture that includes a mating ball, and wherein the adapter includes at least one longitudinal groove having at least a first and expanded radial portion, the depth of the of the expanded radial portion of the groove being greater than the depth of the first radial portion of the groove;

securing the first member and second member together whereby the ball of the sleeve valve is retained in the receiving formation of the first member by the first radial portion of the longitudinal groove of the adapter.

* * * * *